US009003180B2

(12) United States Patent
Shaik et al.

(10) Patent No.: US 9,003,180 B2
(45) Date of Patent: Apr. 7, 2015

(54) DATA ENCRYPTION AND DECRYPTION

(71) Applicant: Verizon Patent and Licensing Inc., Basking Ridge, NJ (US)

(72) Inventors: Ghouse Mohiddin Dattapuram Shaik, Kadapa (IN); Shiva Rama Krishna Nyshadham, Hyderabad (IN); Richa Mittal, New Delhi (IN); Aravind Prathush Vadde, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 137 days.

(21) Appl. No.: 13/851,800

(22) Filed: Mar. 27, 2013

(65) Prior Publication Data

US 2014/0298006 A1    Oct. 2, 2014

(51) Int. Cl.
*H04N 21/2347*    (2011.01)
*H04L 29/06*    (2006.01)
*H04N 21/236*    (2011.01)
*H04N 19/00*    (2014.01)
*H04M 7/00*    (2006.01)

(52) U.S. Cl.
CPC ........ *H04N 21/2347* (2013.01); *H04L 63/0471* (2013.01); *H04N 21/236* (2013.01); *H04L 29/06* (2013.01); *H04N 7/26946* (2013.01); *H04M 7/0039* (2013.01)

(58) Field of Classification Search
CPC ... H04L 29/06; H04M 7/0039; H04N 21/236; H04N 21/2347
USPC .......................................... 713/153; 370/356
See application file for complete search history.

(56) References Cited

U.S. PATENT DOCUMENTS

| 6,499,107 | B1* | 12/2002 | Gleichauf et al. | 726/23 |
|---|---|---|---|---|
| 6,788,800 | B1* | 9/2004 | Carr et al. | 382/100 |
| 2002/0002674 | A1* | 1/2002 | Grimes et al. | 713/156 |
| 2005/0120065 | A1* | 6/2005 | Dirscherl et al. | 708/250 |
| 2007/0189529 | A1* | 8/2007 | Hauge et al. | 380/200 |
| 2009/0022148 | A1* | 1/2009 | Anders | 370/356 |
| 2010/0205428 | A1* | 8/2010 | Weis et al. | 713/153 |
| 2014/0071998 | A1* | 3/2014 | Markovitz et al. | 370/474 |
| 2014/0164565 | A1* | 6/2014 | Sato et al. | 709/217 |
| 2014/0248929 | A1* | 9/2014 | Noonan et al. | 463/9 |

OTHER PUBLICATIONS

Bhan et al., "Information Security Issues in Voice Over Internet Protocol", 2006.*
Bellare et al., "XOR MACs: New Methods for Message Authentication Using Finite Pseudorandom Functions", 1995.*
Boyd et al., "On the General Applicability of Instruction-Set Randomization", 2010.*

* cited by examiner

*Primary Examiner* — O. C. Vostal

(57) ABSTRACT

Systems and methods for data encryption and decryption are provided. Packets of a streaming video from a video source are received. A first packet of the streaming video is encrypted with a encryption key and transmitted to a client device. The first packet is encrypted with a reference key and is designated as a reference packet. A number of packets of the encrypted media that follow the first packet are selected. For each of one or more selected packets, an XOR operation is performed on the respective selected packet with the reference packet. Result values of the XOR operation are rearranged by a shuffle key and divided into segments. Each of the segments is assigned to an even list or an odd list, which are combined to form a respective encrypted packet. The respective encrypted packet is designated as a non-reference packet and is transmitted to the client device.

20 Claims, 7 Drawing Sheets

DATA ENCRYPTION AND DECRYPTION

BACKGROUND

In recent years, an increasing amount of video content has been generated from internet protocol (IP) cameras located remotely from a location of a user viewing the IP camera video content. The generated video content is often encrypted by an application running on a networking device (e.g., gateway, router, etc.) prior to being transmitted to a client device of the user, where the encrypted video content is decrypted by an application running on the client device. In this case, the networking device, upon receipt of data packets for a video stream, encrypts each packet of data and transmits the encrypted data to the user's client device.

Low end networking devices that are sold to consumers are typically priced at a range that is affordable to ordinary consumers. These networking devices contain processors that can handle execution of traditional data encryption algorithms, which are suitable for handling text-based data. However, the processors of these low end networking devices may not be robust enough to encrypt a steady stream of data packets from a video stream via traditional data encryption algorithms.

Encrypting all of the bytes of the video stream not only introduces a delay during the video playback session, but also incurs significant CPU time when the data packets are encrypted by the networking device and decrypted by the user's client device. For example usage of processor of a low end networking device during the encryption process may exceed 99% of the maximum processing capability of the processor. Therefore, the networking device may become overwhelmed by the sheer amount of processing required to encrypt the stream of data packets. While this problem may be somewhat alleviated if the processing power of low end networking device is increased. However, adding additional processors to the networking device and/or using faster processors in the networking device would likely lead to an increase in the cost to produce the networking device as well as an increase in the sales price of the networking device. As a result, the networking device may no longer be affordable to ordinary consumers.

Hence a need exists for a way to encrypt data packets of a video stream without overtaxing a low end networking device and without increasing the cost for producing the networking device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
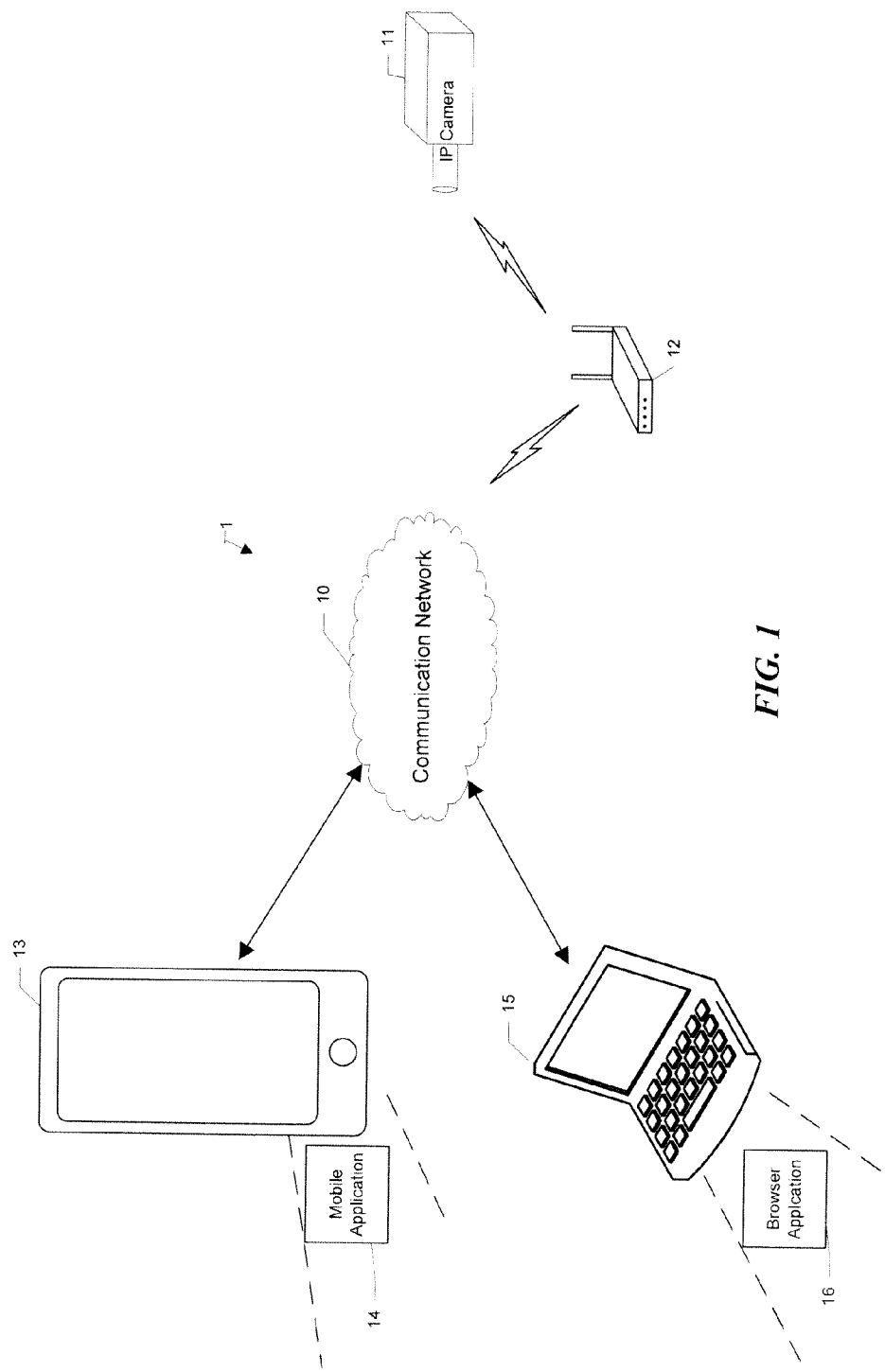
FIG. 1 illustrates an example network architecture for data encryption and decryption.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to data encryption and decryption, and in particular, encryption and decryption of data packets for video streams. According to one example, the encryption key uses an advanced encryption standard (AES) algorithm and is transmitted to the network device through a secure data transfer mechanism (e.g., HTTP, etc). The networking device then designates the first encrypted packet as a reference packet and encrypts the first encrypted packet with a reference key. The reference key, similar to the encryption key, also uses an AES algorithm. The encryption key may be a string that has a different length than the reference key. The networking device then designates a number of encrypted packets of the streaming video that follow the first packet as non-reference packets.

In that regard, the networking device selects a number of packets that follow the first packet. The networking device may obtain a random number from a random number generator to determine the number of packets that follow the first packet to select. For example, if the networking device obtains a randomly generated number of 128, then 128 packets that follow the first packet are selected. For each of the selected packets, the networking device performs an exclusive or (XOR) operation of the respective selected packet with the reference packet and applies a shuffle key to rearrange the result values of the XOR operation. In one example, the shuffle key is a 128 byte asymmetric key comprising an equal number of 0s and 1s. The networking device then divides the rearranged values into segments of a predetermined length and assigns each of the segments to an even list or an odd list based on the value of each segment. The networking device then combines the even and odd list segments to form a respective encrypted packet. The networking device then designates the respective encrypted packet as a non-reference packet and transmits the non-reference packet to the client device.

The networking device repeats the process for each of the selected packets until all of the selected packets have been XORed with the reference packet. The networking device then determines if any additional packets of the video stream remain unencrypted and encrypts a first packet of the additional packets with the encryption key and transmits the encrypted first packet of the additional packets to the client device. In one example, the same encryption key is used throughout the encryption process. In another example, a different encryption key is generated and used for encrypting the additional packets. The networking device then designates the first packet of the additional packets as an additional packet and encrypts the additional packet with the reference key to form an additional reference packet. In one example, the same reference key is used throughout the encryption process. In another example, a different reference key is generated and used for generating the additional reference packet. The networking device then obtains a new randomly generated number to determine the number of packets that follow the additional reference packet to select. The XOR process as described is then repeated for each of the newly selected additional packets until all of the newly selected additional packets have been encrypted and are designated as additional non-reference packets.

The encrypted data packets are transmitted over a communication network and are received by the client device. In one example, a transmission control protocol (TCP) connection is used to ensure the delivery of all of the encrypted data packets from the networking device to the client device. A processor of the client device executes an application (e.g., a media player application) that runs on the client device to decrypt the encrypted data packets. For each of the received packets, the client device determines whether the respective one of the received packets is a reference packet or a non-reference packet. If the respective packet is a reference packet, then the client device decrypts the respective packet with an encryption key to obtain an original packet corresponding to the respective packet. A segment of the video stream that corresponds to the original packet may then be displayed on the client device. In addition, the client device also encrypts the respective packet with the reference key to generate a reference packet, which is used for decryption of the associated non-reference packets.

If the respective packet is a non-reference packet, then the client device uses a shuffle key to rearrange values of the respective packet and divide the rearranged values into segments of a predetermined length. The client device then assigns each of the segments to an even list or an odd list based on a value of each segment and combines the even and odd list segments to form a byte sequence for the respective encrypted packet. The client device then performs an XOR operation of the byte sequence for the respective packet with the reference packet to obtain an original packet corresponding to the respective packet. A segment of the video stream that corresponds to the respective packet may then be displayed on the client device. The described decryption process is then repeated until all of the packets for the stream have been decrypted.

Reference now is made in detail to the examples illustrated in the accompanying drawings and discussed below. FIG. 1 illustrates an example network architecture for data encryption and decryption. A network environment 1 includes an internet protocol (IP) camera 11, a networking device 12, and a number of client devices 13 and 15, where the devices are communicably connected by a network 10. In the example of FIG. 1, client device 13 is depicted as a smartphone and client device 15 is depicted as a laptop computer. Other examples of client devices include, but are not limited to, tablet computers, PDAs, portable media players, desktop computers, internet televisions, etc. In the example of FIG. 1, networking device 12 is depicted as a router. Other example of networking devices include, but are not limited to access points, gateways, etc.

A user request to view a video stream from client device 13 or 15 is transmitted to IP camera 11 via the communication network 10. IP camera 11, upon receipt of the request to view the video stream, transmits data packets for the requested video stream to networking device 12. Networking device 12, upon receipt of the data packets, encrypts the received data packets. Process 200 describes one example method for encrypting the received data packets. The encrypted data packets are then transmitted to client device 13 or 15 via the communication network.

One or more applications running on client device 13 or 15 may be used to decrypt the encrypted data packets. Process 240 describes one example method for decrypting the encrypted data packets. Process 240 may be implemented by one or more software and/or firmware applications that runs on client device 13 or 15. In the example of FIG. 1, a processor (not shown) of client device 13 executes mobile application (e.g., a mobile media player application) 14 to decrypt the encrypted data packets and to provide an interface for displaying the video stream on client device 13. Similarly, a processor (not shown) of client device 15 executes browser application 16 to decrypt the encrypted data packets and to provide an interface for displaying the video stream on client device 15.

The communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The client devices 13 and 15 may are capable of voice telephone communications through the network 10

The communication network 10 allows users of the client devices 13 and 15 (and other client devices not shown) to initiate and receive telephone calls to each other as well as through the public switched telephone network or "PSTN" and telephone stations connected to the PSTN. The communication network 10 typically offers a variety of data services via the Internet 23, such as downloads, web browsing, email, etc.

Figure 2A:
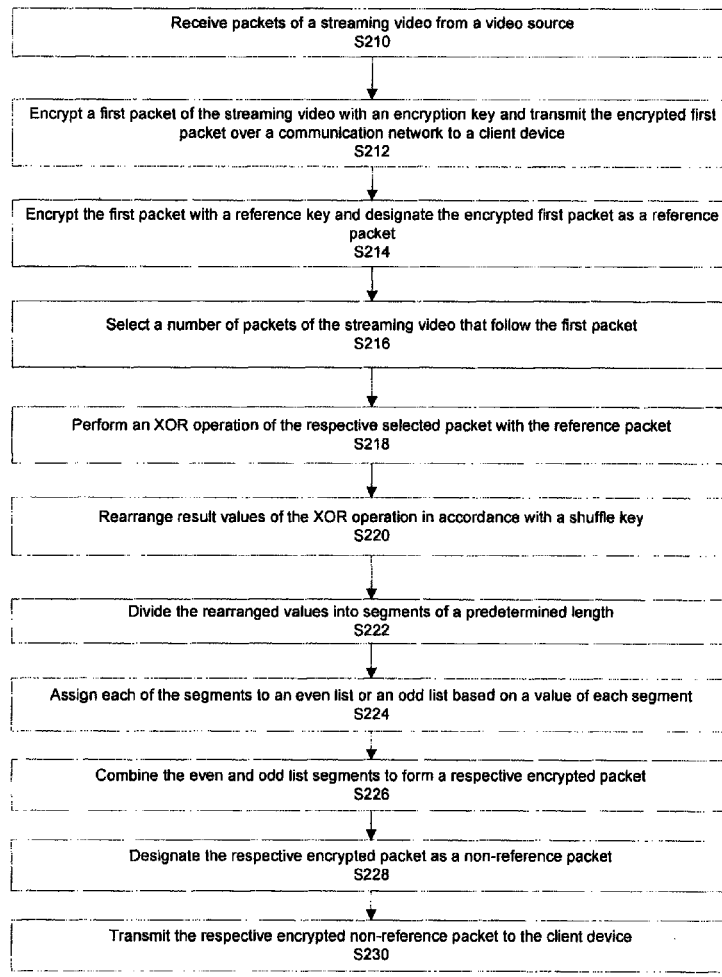
FIG. 2A is a flow chart useful in understanding a process for data encryption.

FIG. 2A is a flow chart useful in understanding a process for data encryption. Although the operations in process 200 are shown in a particular order, certain operations may be performed in different orders or at the same time.

Data packets of a streaming video from a video source (e.g., an IP camera) are received by a networking device in block S210. The data packets may be transmitted from the video source to the networking device via a direct connection (device to device connection), or indirectly, where the data packets are transferred to from the video source to a third client device and transferred from the third client device to the networking device. Examples of networking devices include, but are not limited to, gateways, routers, access points, etc. The number of data packets that are transferred is directly proportional to the length of the streaming video. The networking device may maintain a record of an order at which each of the data packets are received. For example, the networking device may identify a first received packet, a second received packet, a 1000th received packet, etc. The video source may also identify an order in which the packets were transmitted to the networking device. An encryption key that is used in the encryption process is generated using an AES algorithm may be generated by a third electronic device (e.g., an electronic device of a server that hosts the AES algorithm) and transmitted from the third electronic device to the networking device. In some cases, the encryption key is generated by a hardware component of the networking device.

In block S212, the networking device encrypts a first packet of the streaming video with the encryption key and transmits the encrypted first packet over a communication network to a client device. The first packet may be encrypted using the AES algorithm a similar algorithm. In block S212, the networking device encrypts a first packet of the streaming video with the encryption key and transmits the encrypted first packet over a communication network to a client device. The first packet may be encrypted using the AES or similar algorithm. In block S214, the networking device encrypts (e.g. with the AES algorithm, etc.) the first packet with a reference key and designates the encrypted first packet as a reference packet. In one example, the reference key is also generated by the third electronic device using the algorithm and is transmitted from the third electronic device to the networking device. In another example, the reference key is generated locally by the networking device.

In block S216, the networking device selects a number of encrypted packets of the streaming video that follow the first packet. The networking device may utilize a random number generator to determine the number of packets of the streaming video that should be selected. In one example, the networking device uses the random number generator to generate a random number that has a numerical value between a minimum value (e.g., 1) and a maximum value (e.g., 1028). The number of selected packets would then be equal to the numerical value of the generated random number. For example, if the random number generator generates a value of 256, then networking device selects the first 256 packets (e.g., packets 2-257) that follow the first packet.

The networking device then performs several operations on each respective one of the non-reference packets. In block S218, the networking device performs an XOR operation of the respective selected packet with the reference packet. In block S220, the networking device uses a shuffle key to rearrange result values of the XOR operation. In one example, the shuffle key is a 128 byte asymmetric key that includes an equal number of 0s and 1s. In this case, since the shuffle key contains an equal number of 0s, and 1s, an XOR operation of packet with the shuffle key would produce an equal number of 0s and 1s (e.g., 64 0s and 64 1s). In block S222, the networking device divides the rearranged values into segments of a predetermined length. In block S224, the networking device assigns each of the segments to an even list (e.g., a list that includes 64 0s) or an odd list (e.g., a list that includes 64 1s) based on a value of each segment. In block S226, the networking device combines the even and odd list segments to form a respective encrypted packet. In block S228, the networking device designates the respective encrypted packet as a non-reference packet. In block S230, the networking device transmits the non-reference packet to the client device.

The streaming video may produce more packets than the ones that were first designated as reference and non-reference packets. For example, if the streaming video produced 1000 packets and the random number generator first generated a value of 256, then only the first 257 encrypted packets of the 1000 packets are initially designated as either a reference packet or a non-reference packet. In that regard, the networking device may also determine if additional packets (e.g., packet 258-1000) follow the last packet (e.g., packet 257) of the initially designated non-reference packets. The networking device then encrypts a First packet of the additional packets (e.g., packet 258) that follow the last packet of the initially selected packets with the encryption key and transmits the newly encrypted packet (e.g., packet 258) over the communication network to the client device. The networking device may then encrypt the first packet of the additional packets with the reference key and designate the encrypted first packet of the additional packets as an additional reference packet. The networking device then generates another random number that has a numerical value between a minimum value and a maximum value, and selects a number of the additional packets that follow the first packet of the additional packets (e.g., packets 259-1000) based on the numerical value of the newly generated random number.

In one example, the networking device obtains a random number of 300. For each packet of the 300 additional packets (259-559) that follow additional reference packet 258, the networking device, the networking device performs an XOR operation of the respective packet with the additional reference packet. The networking device then uses a shuffle key to rearrange the result values of the XOR operation, divides the rearranged values into segments of a predetermined length, assigns each of the segments to an even list or an odd list based on a value of each segment, and combines the even and odd list segments to form a respective encrypted packet. The networking device then designates the respective encrypted packet as a non-reference packet and transmits the non-reference packet over the communication network to the client device. The described process may continue until all 1000 packets have been encrypted and transmitted to the electronic device.

The networking device may flag a packet prior to transmitting the encrypted packet to the client device. In one example, the networking device assigns a first logic state (e.g., true) to the packet if the packet is the first packet of each bundle of data packets as determined by the random number generator (e.g., the first packet, the N+2 packet, N+2+M+2 packet, where M is another random number, etc.) and assigns a second logic state (e.g. false) to the packet if the packet is one of one or more non-reference packets. The assigned logic state can then be used by a processor that decodes the encrypted packet to determine whether the packet is a reference packet or a non-reference packet.

Figure 2B:
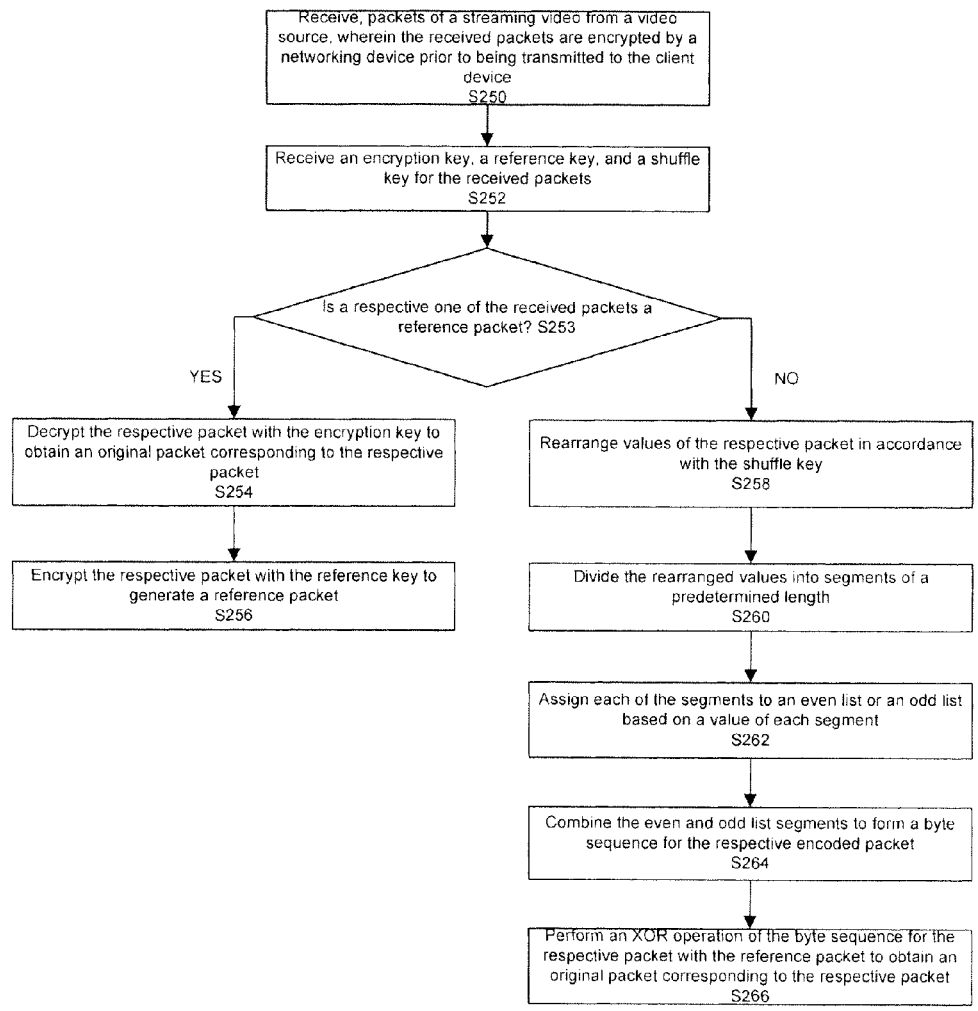
FIG. 2B is a flow chart useful in understanding a process for data decryption.

FIG. 2B is a flow chart useful in understanding a process for data decryption. Although the operations in process 240 are shown in a particular order, certain operations may be performed in different orders or at the same time. Although the operations described in process 240 can be performed on a user's client device, some or all of the operations may also be performed on another device (e.g., a networking device that the user's client device is connected to, etc.).

In block S250, the client device receives packets of a streaming video from a video source, where the received packets are encrypted by a networking device prior to being transmitted to the client device. In block S252, the client device receives an encryption key, a reference key, and a shuffle key for the received packets. In one example, the encryption key, the reference key, and the shuffle key are each transmitted from the networking device. In another example, the respective keys are transmitted from a third electronic device (e.g., an electronic device of a server that hosts an AES algorithm used for generating the encryption key, the reference key, and the shuffle key). For each of the received packets, the client device determines if the respective one of the received packets is a reference packet in block S253. Each of the received packets may include an identifier that identifies whether the respective packet is a reference packet or a non-reference packet.

As discussed in the process for data encryption, the networking device may assign a logic state (e.g., true if the packet is the first packet or the first packet following the last non-reference packet, and false for non-reference packet, etc.) to each of the packets prior to transmitting the packets to the client device. The client device, upon receipt of the respective packet, determines whether the logic state associated with the respective packet and designates the respective packet based on the logic state. If the respective packet is the first packet, then the process proceeds to block S254, where the client device decrypts the respective packet with the encryption key to obtain an original packet corresponding to the respective packet. In block S256, the client device encrypts the respective packet with the reference key to generate a reference packet.

Alternatively, if the respective packet is not a reference packet, then the process proceeds to block S258, and the client device rearranges values of the respective packet in accordance with a shuffle key. In block S260, the client device divides the rearranged values into segments of a predetermined length. In block S262, the client device assigns each of the segments to an even list or an odd list based on a value of each segment. In block S264, the client device combines the even and odd list segments to form a byte sequence for the respective encrypted packet. In block S266, the client device performs an XOR operation of the byte sequence for the respective packet with the reference packet to obtain an original packet corresponding to the respective packet.

Figure 3A:
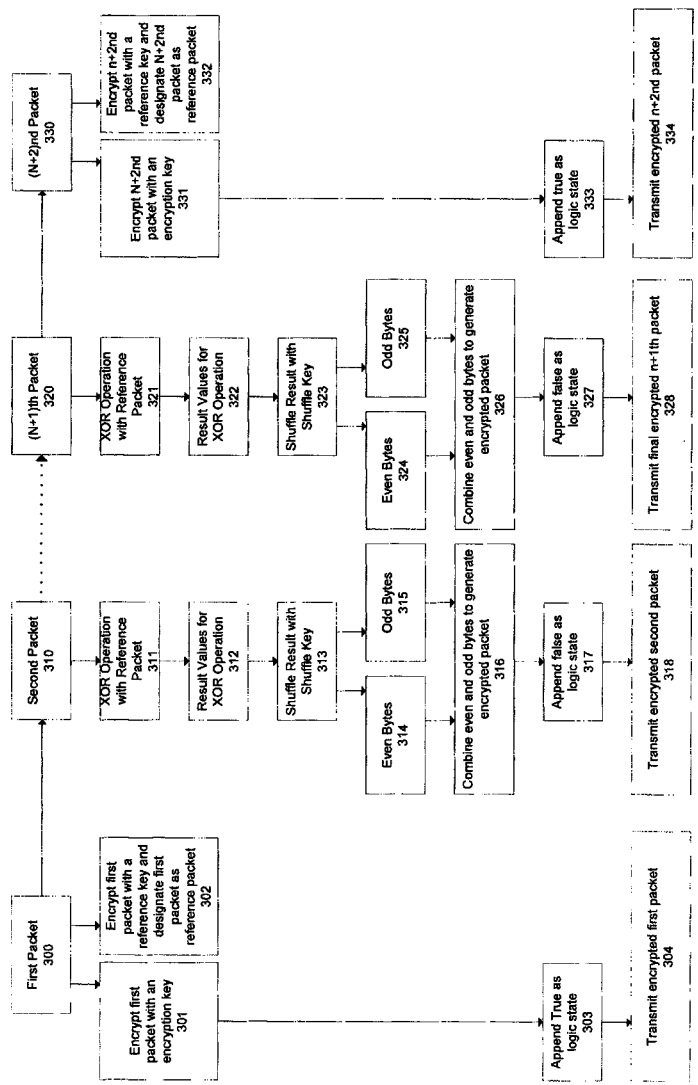
FIG. 3A provides a block diagram illustration of some of the operations of the process of FIG. 2A.

FIG. 3A provides a block diagram illustration of some of the operations of the process of FIG. 2A. As shown in FIG. 3A, first packet 300 is received by a networking device. The networking device encrypts first packet with an encryption key in block 301, appends true as a logic state in block 303, and transmits the encrypted first packet in block 304. The networking device also encrypts the first packet with a reference key and designates the encrypted first packet as a reference packet in block 302. The networking device then receives second packet 310.

In block 311, the networking device performs an XOR operation on second packet 310 using reference packet 302 to obtain result values 312. In block 313, the networking device shuffles result values 312 with a shuffle key and divides the shuffled result values into even bytes 314 and odd bytes 315. In block 316, the networking device combines even bytes 314 with odd bytes 315 to obtain the encrypted second packet, and appends to the encrypted combined packet false as a logic state in block 317 to designate the encrypted second packet as a non-reference packet. In block 318, the networking device transmits the encrypted second packet.

The process described in blocks 311-318 is repeated for each packet after the second packet through the N+1th packet. The value of N is determined by a random number generator that generates a value that is between a minimum value and a maximum value. The networking device performs operations described in blocks 310-318 for N numbers of packets that follow the first packet. For example, if the random number generator produces a value of 256, then the networking device repeats the process described in blocks 311-318 for 256 packets (e.g., from packet 2 to packet 257).

As shown in block 321, networking device performs an XOR operation on N+1th (e.g., 257th) packet 320 using reference packet 302 to obtain result values 322. In block 323, the networking device shuffles result values 322 with a shuffle key and divides the shuffled result values into even bytes 324 and odd bytes 325. In block 326, the networking device combines even bytes 324 with odd bytes 325 to obtain the encrypted N+1th packet, and appends to the encrypted combined packet false as a logic state in block 327 to designate the encrypted N+1th (e.g., 257th) packet as a non-reference packet. In block 328, the networking device transmits the encrypted N+1th packet.

The networking device does not repeat the process described in steps 311-318 for the N+2nd (e.g., 258th) packet 330. Rather, the networking device encrypts N+2nd (e.g., 258th) packet with an encryption key in block 331, appends true as the logic state for the N+2nd (e.g., 258th) packet in block 333 and transmits the encrypted n+2nd (e.g., 258th) packet in block 334. In one example, the encryption key used to encrypt the N+2nd packet in block 331 is identical to the encryption key used to encrypt the first packet in block 301. In another example, different encryption keys are used to encrypt the N+2nd packet in block 331 and the first packet in block 301. The networking device also encrypts the N+2nd (e.g., 258th) packet with a reference key and designates the n+2nd packet as another reference packet. In one example, the reference key that is encrypted with the N+2nd packet in block 332 is identical to the reference key that is encrypted with the first packet in block 302. In another example, different reference keys are encrypted with the N+2nd packet and first packet. The networking device then uses the random number generator to obtain another random number M and performs operations described in blocks 310-318 for M packets that follow N+2nd (e.g. 28th) packet. This process is then repeated until all of the received data packets have been encrypted.

Figure 3B:
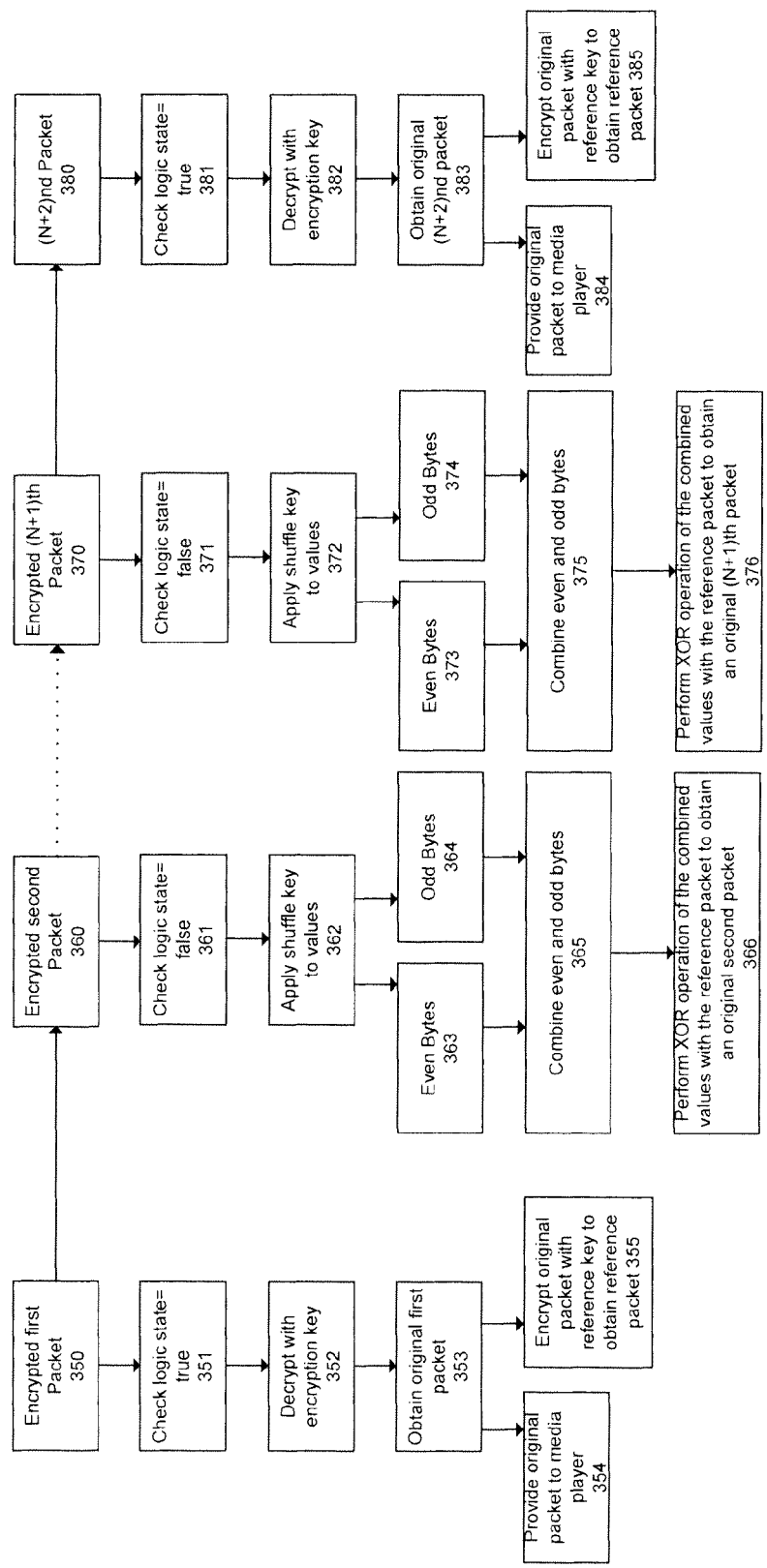
FIG. 3B provides a block diagram illustration of some of the operations of the process of FIG. 2B.

FIG. 3B provides a block diagram illustration of some of the operations of the process of FIG. 2B. As shown in FIG. 3B, first encrypted packet 350 is received by a client device. In the example of FIG. 3B, values of first encrypted packet 350 are identical to values of encrypted first packet 304, which was transmitted from the networking device described in FIG. 3A. In block 351, the client device checks the logic state of encrypted first packet 350.

As described in FIG. 3A, a logic state of true for a data packet indicates that the respective data packet is an encrypted first packet or an encrypted first packet that follows the last non-reference packet (e.g., first additional packet), and a logic state of false for the data packet indicates that the respective data packet is a non-reference packet. In one example, the client device removes the logic state from encrypted first packet 350 after determining its logic state. In block 352, the client device, upon determining that the packet is a reference packet, decrypts encrypted first packet 350 with an encryption key 352 to obtain original first packet 353. In one example, the encryption key is transmitted by the networking device along with the first encrypted packet. In another example, the encryption key is provided by the third electronic device (e.g., an electronic device of a server that hosts the AES algorithm). In this case, the third electronic device provides the encryption key to both the networking device and the client device. In the example of FIG. 3B, values of original first packet 353 are identical to values of first packet 300, which was transmitted to the networking device prior to the encryption process. Original first packet 353 is provided to a media player application in block 364. Original first packet 353 is also encrypted using a reference key to obtain a reference packet in block 355.

In block 360, the client device receives an encrypted second packet. In the example of FIG. 3B, values of encrypted second packet 360 are identical to values of encrypted second packet 318, which was transmitted from the networking device described in FIG. 3A. In block 361, the client device checks the logic state of encrypted second packet 360. In one example, the client device removes the logic state from encrypted second packet 360 after determining its logic state. In another example, the client device ignores any byte sequence that is associated with the logic state when the operations described in blocks 362-368 are performed. In block 362, the client device, upon determining that encrypted second packet 360 is a non-reference packet, decrypts the encrypted second packet 360 using the encryption key, applies a shuffle key to the values of encrypted second packet 360 in block 362 and divides the shuffled values of encrypted second packet 360 to even bytes 363 and odd bytes 364. Even bytes 363 and odd bytes 364 are combined in block 365. In block 366, the client device performs a XOR operation of combined values 365 using reference packet 355 to obtain an original second packet. In the example of FIG. 3B, values of the original second packet are identical to values of second packet 310.

The client device repeats the process described in blocks 362-366 for each received non-reference packet that follows encrypted first packet 350. Since the number of non-reference packets that follow encrypted first packet 350 is equal to the value of the first randomly generated number N, the process described in blocks 362-366 is repeated for the encrypted second packet 360 until the encrypted N+1th packet 370.

For the N+1th packet 370, the client device checks the logic state of the N+1th packet in block 371. In one example, the client device removes the logic state from encrypted N+1th packet 370 after determining its logic state. In block 372, the client device, upon determining that encrypted N+1th packet 370 is a non-reference packet, applies a shuffle key to the values of encrypted N+1th packet 370 in block 372 and divides the shuffled values of encrypted N+1th packet 370 to even bytes 373 and odd bytes 374. Even bytes 373 and odd bytes 374 are combined in block 375. In block 376, the client device performs a XOR operation of combined values 375 using reference packet 355 to obtain an original N+1th packet. In the example of FIG. 3B, values of original N+1th packet 376 are identical to values of N+1th packet 320.

The client device receives N+2nd packet in block 380. In block 381, the client device checks the logic state of encrypted N+2nd packet 380. As described in FIG. 3A, a logic state of true for a data packet indicates that the respective data packet is the first packet or a first packet that follows the last non-reference packet and a logic state of false for the data packet indicates that the respective data packet is a non-reference data packet. In one example, the client device removes the logic state from encrypted N+2nd packet 380 after determining its logic state. In block 382, the client device, upon determining that encrypted N+2nd packet is a reference packet, decrypts encrypted N+2nd packet 380 with an encryption key 382 to obtain original N+2nd packet 383. In the example of FIG. 3B, values of original N+2nd packet 383 are identical to values of N+2nd packet 330, which was transmitted to the networking device prior to the encryption process. Original N+2nd packet 383 is provided to a media player application in block 384. Original N+2nd packet 383 is also encrypted with a reference key to obtain an additional reference packet in block 385. The additional reference packet is then used in XOR operations for the next set of non-reference packets to obtain corresponding original packets.

Figure 4:
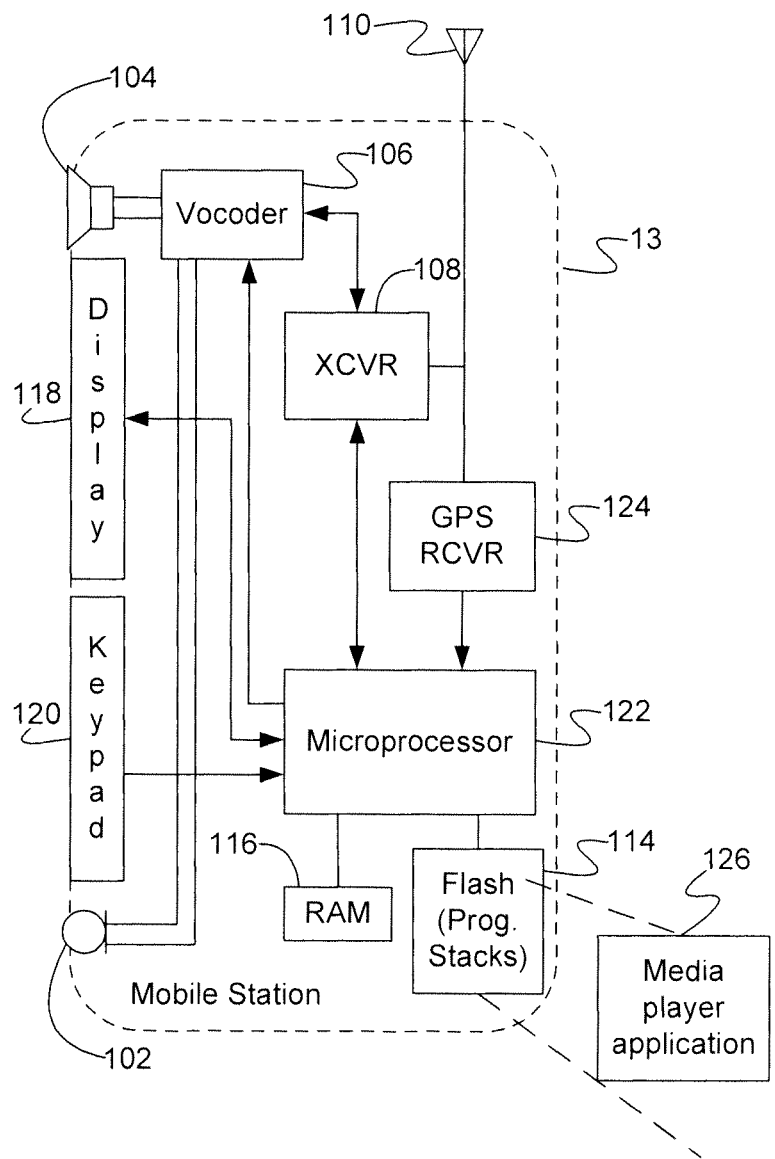
FIG. 4 provides a block diagram illustration of an exemplary non-touch type client device.

FIG. 4 provides a block diagram illustration of an exemplary non-touch type client device. FIG. 4 provides a block diagram illustration of an exemplary non-touch type client device 13. Although the client device 13 may be a smartphone or may be incorporated into another device, such as a personal digital assistant (PDA) or the like, for discussion purposes, the illustration shows the client device 13 is in the form of a handset. The handset embodiment of the client device 13 functions as a normal digital wireless telephone station. For that function, the client device 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the client device 13 also includes at least one digital transceiver (XCVR) 108. Today, the client device 13 would be configured for digital wireless communications using one or more of the common network technology types. The concepts discussed here encompass embodiments of the client device 13 utilizing any digital transceivers that conform to current or future developed digital wireless communication standards. The client device 13 may also be capable of analog operation via a legacy network technology.

The transceiver 108 provides two-way wireless communication of information, such as encrypted data packets containing audio content, visual content, audiovisual content, multimedia content, and the like, vocoded speech samples and/or digital information, in accordance with the technology of the network 15. The transceiver 108 also sends and receives a variety of signaling messages in support of the various voice and data services provided via the client device 13 and the network 15. Each transceiver 108 connects through RF send and receive amplifiers (not separately shown) to an antenna 110. The transceiver 108 may also support various types of mobile messaging services, such as short message service (SMS), enhanced messaging service (EMS) and/or multimedia messaging service (MMS).

A GPS receiver 124 may share the same antenna 110 used by the transceiver 108, or there may be a separate additional antenna for the GPS receiver 124. Under control of the microprocessor 122, the GPS receiver 124 receives and processes signals from one or more satellites of the constellation of GPS satellites. From its processing, the GPS receiver 121 supplies GPS data to the microprocessor 122, such as pseudorange measurements and associated PN codes for measured satellite signals. Associated computations may be performed in the microprocessor 122 or by a processor or the like included in the GPS receiver 124.

The client device 13 includes a display 118 for displaying audio content, video content, audiovisual content, multimedia content, messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed while audio content, visual content, audiovisual content, and the like are being displayed via display 118.

A microprocessor 122 serves as a programmable controller for the client device 13, in that it controls all operations of the client device 13 in accord with programming that it executes, for all normal operations, and for operations involved in decrypting encrypted data packets of audio content, visual content, audiovisual content, and the like, as under consideration here. In the example, the client device 13 includes flash type program memory 114, for storage of various "software" or "firmware" program routines and mobile configuration settings, such as mobile directory number (MDN) and/or mobile identification number (MIN), etc. The client device 13 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, multimedia application 126, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 122.

As outlined above, the client device 13 includes a processor, and programming stored in the flash memory 114 configures the processor so that the client device is capable of performing various desired functions, including in this case the functions involved in the technique for decrypting data packets of audio content, visual content, audiovisual content including media player applications 126, which includes programming that provides decryption of encrypted data packets of audio content, visual content, audiovisual content, multimedia content, and the like. These elements could be special purpose devices. However, in the example, these elements are implemented by appropriate configuration and/or programming of general purpose computers.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for decryption of data packets containing audio content, visual content, audiovisual content, multimedia content, and the like. The software code is executable by microprocessor 122. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for decryption of data packets containing audio content, visual content, audiovisual content, multimedia content, and the like, in essentially the manner performed in the implementations discussed and illustrated herein.

Figure 5:
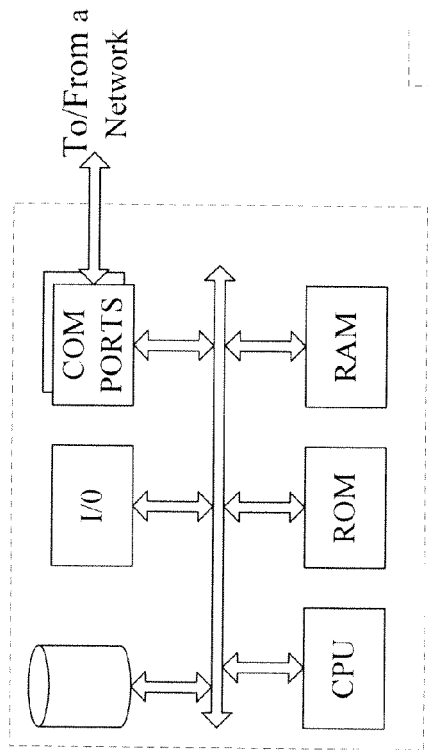
FIG. 5 is a simplified functional block diagram of a computer that may be configured as a host or server.
Figure 6:
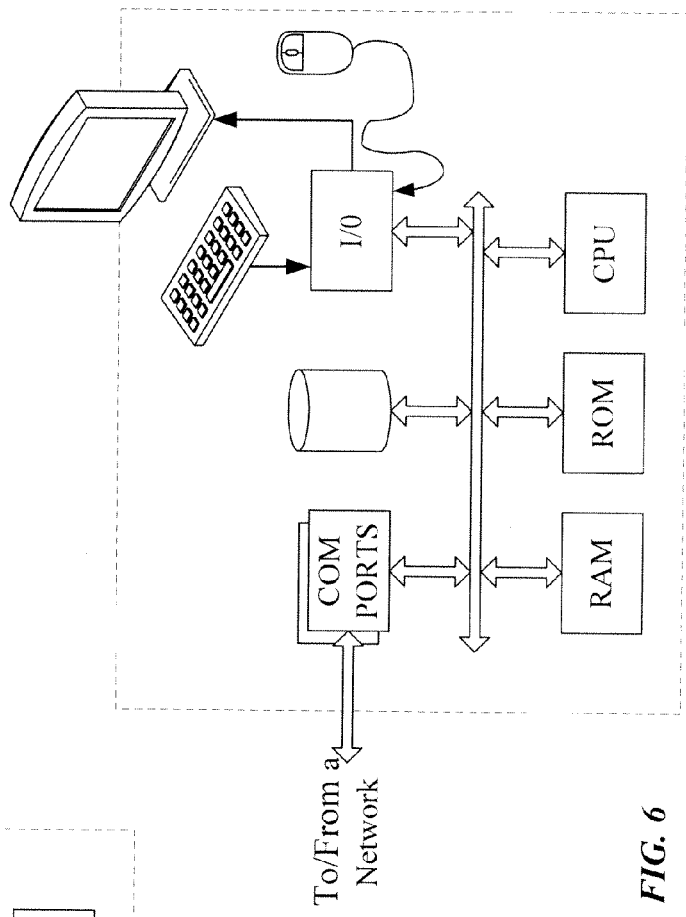
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods for data encryption and/or decryption outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the process for data encryption and/or decryption, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A networking device, comprising:
    a communication interface; and
    a processor coupled to the communication interface, wherein the processor is configured to control operations of the networking device to cause the networking device to implement functions, including functions to:
        receive packets of a streaming video from a video source;
        encrypt a first packet of the streaming video with an encryption key and transmit the encrypted first packet over a communication network to a client device;
        encrypt the first packet using a reference key to form a reference packet;
        select a number of packets of the streaming video that follow the first packet; and
        for each respective one of the selected packets:
            perform an exclusive or (XOR) operation of the respective selected packet with the reference packet;
            rearrange result values of the XOR operation in accordance with a shuffle key;
            divide the rearranged values into segments of a predetermined length;
            assign each of the segments to an even list or an odd list based on a value of each segment;
            combine the even and odd list segments to form a respective encrypted packet;
            designate the respective encrypted packet as a non-reference packet; and
            transmit the respective encrypted non-reference packet over the communication network to the client device.

2. The networking device of claim 1, wherein the processor is further configured to control operations of the networking device to cause the networking device to implement functions, including functions to:
    for each respective one of the received packets:
        assign a first logic state to the encrypted first packet of the received packets; and
        assign a second logic state if the respective packet is one of the non-reference packets.

3. The networking device of claim 1, wherein the processor is further configured to control operations of the networking device to cause the networking device to implement functions, including functions to:
    generate a first random number, the first random number having a numerical value between a minimum value and a maximum value, wherein the number of selected packets is equal to the numerical value of the generated first random number.

4. The networking device of claim 3, wherein the processor is further configured to control operations of the networking device to cause the networking device to implement functions, including functions to:
  determine if additional packets follow a last packet of the non-reference packets;
  encrypt a first packet of the additional packets that follow the last packet of the non-reference packets with a second encryption key and transmit the encrypted packet over the communication network to the client device;
  encrypt the first packet of the additional reference packet with the reference key to generate an additional reference packet;
  generate a second random number, the second random number having a numerical value between a minimum value and a maximum value; and
  select a number of the additional packets that follow the first packet of the additional packets, wherein the number of selected additional packets that follow the first packet of the additional packets is equal to the numerical value of the generated second random number.

5. The networking device of claim 4, wherein the processor is further configured to control operations of the networking device to cause the networking device to implement functions, including functions to:
  assign a first logic state to the first packet of the additional packets;
  designate each of the selected additional packets that follow the first packet of the additional packets as non-reference packets; and
  assign a second logic state to each of the non-reference packets.

6. The networking device of claim 4, wherein the processor is further configured to control operations of the networking device to cause the networking device to implement functions, including functions to:
  perform an XOR operation of the respective packet with the additional reference packet;
  rearrange result values of the XOR operation in accordance with a shuffle key;
  divide the rearranged values into segments of a predetermined length;
  assign each of the segments to an even list or an odd list based on a value of each segment;
  combine the even and odd list segments to form a respective encrypted packet; and
  transmit the respective encrypted packet over the communication network to the client device.

7. The networking device of claim 1, wherein the encryption key is generated using an AES encryption algorithm and is transmitted to the networking device prior to the first packet being encrypted by the networking device.

8. The networking device of claim 7, wherein the reference key is generated using the AES encryption algorithm.

9. The networking device of claim 1, wherein:
  the shuffle key is a 128 byte asymmetric key comprising an equal number of 0s and 1s.

10. A method comprising steps of:
  receiving packets of a streaming video from a video source;
  encrypting a first packet of the streaming video with an encryption key and transmitting the encrypted first packet over a communication network to a client device;
  encrypting the first packet with a reference key and designating the first packet as a reference packet;
  selecting a number of packets of the streaming video that follow the first packet; and
  for each respective one of the selected packets:
    performing an exclusive or (XOR) operation of the respective selected packet with the reference packet;
    rearranging result values of the XOR operation in accordance with a shuffle key;
    dividing the rearranged values into segments of a predetermined length;
    assigning each of the segments to an even list or an odd list based on a value of each segment;
    combining the even and odd list segments to form a respective encrypted packet;
    designating the respective encrypted packet as a non-reference packet; and
    transmitting the respective encrypted non-reference packet over the communication network to the client device.

11. The method of claim 10, further comprising the steps of:
  for each of the received packets:
    assigning a first logic state to the first encrypted packet of the received packets; and
    assigning a second logic state if the respective packet is one of the non-reference packets.

12. The method of claim 11, further comprising the step of:
  generating a first random number, the first random number having a numerical value between a minimum value and a maximum value, wherein the number of selected packets is equal to the numerical value of the generated first random number.

13. The method of claim 12, further comprising the steps of:
  determining if additional packets follow a last packet of the non-reference packets;
  encrypting a first packet of the additional packets that follow the last packet of the non-reference packets with the encryption key and transmitting the encrypted packet over the communication network to the client device;
  encrypting the first packet of the additional packets with the reference key to generate an additional reference packet;
  generating a second random number, the second random number having a numerical value between a minimum value and a maximum value; and
  selecting a number of the additional packets that follow the first packet of the additional packets, wherein the number of selected additional packets that follow the first packet of the additional packets is equal to the numerical value of the generated second random number.

14. The method of claim 13, further comprising the steps of:
  assigning a first logic state to the first packet of the additional packets;
  designating each of the selected additional packets that follow the first packet for the additional packets as non-reference packets; and
  assigning a second logic state to each of the non-reference packets.

15. The method of claim 14, wherein for each respective packet of the selected additional packets that follow the first packet of the additional packets, the steps further comprise:
  performing an XOR operation of the respective packet with the additional reference packet;
  rearranging result values of the XOR operation in accordance with a shuffle key;
  dividing the rearranged values into segments of a predetermined length;

assigning each of the segments to an even list or an odd list based on a value of each segment;

combining the even and odd list segments to form a respective encrypted packet; and transmitting the respective encrypted packet over the communication network to the client device.

16. The method of claim 10, further comprising the step of:

using an AES encryption algorithm to generate the encrypted key an the reference key.

17. The method of claim 10, wherein:

the shuffle key is a 128 byte asymmetric key comprising an equal number of 0s and 1s.

18. A client device comprising:

a communication interface; and a processor coupled to the communication interface, wherein the processor is configured to control operations of the client device to cause the client device to implement functions, including functions to:

receive packets of a streaming video from a video source, wherein the received packets are encrypted by a networking device prior to being transmitted to the client device;

receive an encryption key, a reference key and a shuffle key for the received packets;

determine, for each respective one of the received packets, if the respective packet is a reference packet or one of one or more non-reference packets;

if the respective packet is the reference packet:

decrypt the respective packet with the encryption key to obtain an original packet corresponding to the respective packet, and encrypt the respective packet with the reference key to generate a reference packet;

if the respective packet is one of the one or more non-reference packets:

rearrange values of the respective packet in accordance with the shuffle key;

divide the rearranged values into segments of a predetermined length;

assign each of the segments to an even list or an odd list based on a value of each segment;

combine the even and odd list segments to form a byte sequence for the respective packet; and perform an exclusive or (XOR) operation of the byte sequence for the respective packet with the reference packet to obtain an original packet corresponding to the respective packet.

19. The client device of claim 18, wherein an AES encryption algorithm is used to generate the encrypted key and the reference key.

20. The client device of claim 18, wherein the shuffle key is a 128 byte asymmetric key comprising an equal number of 0s and 1s.

* * * * *